(12) United States Patent
Szkrybalo et al.

(10) Patent No.: US 10,864,824 B2
(45) Date of Patent: Dec. 15, 2020

(54) THERMAL MANAGEMENT SYSTEM FOR ELECTRIFIED VEHICLE

(71) Applicant: Ford Global Technologies, LLC, Dearborn, MI (US)

(72) Inventors: Bradley Szkrybalo, West Bloomfield, MI (US); Hamish Lewis, Troy, MI (US); Dinakara Karanth, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 82 days.

(21) Appl. No.: 16/101,550

(22) Filed: Aug. 13, 2018

(65) Prior Publication Data

US 2020/0047626 A1 Feb. 13, 2020

(51) Int. Cl.
| | |
|---|---|
| *B60L 58/26* | (2019.01) |
| *B60H 1/00* | (2006.01) |
| *H01M 10/663* | (2014.01) |
| *H01M 10/613* | (2014.01) |
| *H01M 10/625* | (2014.01) |
| *H01M 10/635* | (2014.01) |

(52) U.S. Cl.
CPC .......... *B60L 58/26* (2019.02); *B60H 1/00278* (2013.01); *B60H 1/00885* (2013.01); *B60H 1/00392* (2013.01); *H01M 10/613* (2015.04); *H01M 10/625* (2015.04); *H01M 10/635* (2015.04); *H01M 10/663* (2015.04)

(58) Field of Classification Search
None
See application file for complete search history.

(56) References Cited

U.S. PATENT DOCUMENTS

| | | |
|---|---|---|
| 8,448,460 B2 | 5/2013 | Dogariu et al. |
| 2014/0374060 A1 | 12/2014 | Labaste Mauhe et al. |
| 2017/0088006 A1 | 3/2017 | Blatchley et al. |
| 2019/0291540 A1* | 9/2019 | Gutowski .......... B60H 1/00278 |

* cited by examiner

*Primary Examiner* — Karie O'Neill Apicella
(74) *Attorney, Agent, or Firm* — David Kelly; Brooks Kushman PC

(57) ABSTRACT

A vehicle thermal management system including a cabin thermal loop, a battery thermal loop, a parallel valve assembly, and a controller is provided. The cabin thermal loop may include a first chiller. The battery thermal loop may include a second chiller and a high-voltage (HV) battery. The parallel valve assembly selectively may link the thermal loops. The controller may be programmed to, responsive to detection of a high load condition, command the parallel valve assembly to link the thermal loops such that the chillers operate together to cool a vehicle cabin and the HV battery. The parallel valve assembly may include a three-way valve and a conduit system selectively connecting the chillers, the three-way valve, and the HV battery.

7 Claims, 5 Drawing Sheets

THERMAL MANAGEMENT SYSTEM FOR ELECTRIFIED VEHICLE

TECHNICAL FIELD

The present disclosure relates to vehicle thermal management systems to assist in managing thermal conditions of a vehicle cabin and a vehicle high-voltage battery.

BACKGROUND

Vehicle thermal management systems may include control strategies to manage thermal conditions of vehicle cabins and vehicle high-voltage batteries. Vehicles may have two separate refrigerant loops, each to manage thermal conditions of one of the vehicle cabin or the high-voltage battery. Current thermal management systems do not have enough cooling capacity to cool both the vehicle cabin and the high-voltage battery at a same time under certain vehicle operating conditions.

SUMMARY

A vehicle thermal management system includes a cabin thermal loop, a battery thermal loop, a parallel valve assembly, and a controller. The cabin thermal loop includes a first chiller. The battery thermal loop includes a second chiller and a high-voltage (HV) battery. The parallel valve assembly selectively links the thermal loops. The controller is programmed to, responsive to detection of a high load condition, command the parallel valve assembly to link the thermal loops such that the chillers operate together to cool a vehicle cabin and the HV battery. The parallel valve assembly may include a three-way valve and a conduit system selectively connecting the chillers, the three-way valve, and the HV battery. The controller may be further programmed to transition the three-way valve between a first position in which the first chiller is not in fluid communication with the HV battery and a second position in which both the first chiller and the second chiller are in fluid communication with the HV battery. The cabin thermal loop may further include an electronic expansion valve disposed between a condenser and a chiller. The electronic expansion valve may include a shutoff valve in communication with the controller and the controller may be further programmed to open the shutoff valve responsive to detection of a cooling capacity request in excess of a predetermined threshold. The cabin thermal loop may further include an electronic expansion valve and a shutoff valve disposed between a condenser and a chiller. The shutoff valve may be in communication with the controller and the controller may be further programmed to open the shutoff valve responsive to detection of a cooling capacity request in excess of a predetermined threshold. The high load condition may be one of a vehicle trailer mode or a heavy cargo mode and the controller may be further programmed to link operation of the first and second chillers such that a cabin temperature of the vehicle cabin is maintained within a passenger selected range and a battery temperature of the HV battery is maintained within a normal operating temperature threshold. The controller may be further programmed to, responsive to detection of a steady state driving condition, output a command to the parallel valve assembly to link the thermal loops and output operating commands to the first chiller and the second chiller to operate at distributed levels based on requested cooling capacity from each of the cabin thermal loop and the battery thermal loop. The cabin thermal loop may further include a condenser, a compressor, and an evaporator in fluid communication with the first chiller to define a cooling capacity. The controller may be further programmed to link the cabin thermal loop and the battery thermal loop with one another responsive to detection of a cabin thermal loop output to a vehicle cabin being less than the cooling capacity of the cabin thermal loop and such that the evaporator and the first chiller assist in cooling the HV battery.

A vehicle thermal management system includes a cabin thermal loop, a battery thermal loop, a series valve assembly, and a controller. The cabin thermal loop includes a first chiller in fluid communication with a vehicle cabin. The battery thermal loop includes a second chiller in fluid communication with a HV battery. The series valve assembly selectively links the cabin and battery thermal loops and includes a three-way valve and a conduit system arranged with one another to selectively link the first chiller and the second chiller to deliver cooling capacity to the HV battery. The controller is programmed to, responsive to detection of an available amount of cabin thermal loop cooling capacity exceeding a detected passenger vehicle cabin cooling capacity request, output a command to the series valve assembly to release the excess cooling capacity from the cabin thermal loop to cool the HV battery. The controller may be further programmed to, responsive to detection of activation of a vehicle trailer mode or detection of a vehicle load request over a predetermined threshold, output a command to the series valve assembly to release the excess cooling capacity from the cabin thermal loop to cool the HV battery. The assembly may further include one or more sensors to detect an amount of cooling capacity available from each of the cabin thermal loop and the battery thermal loop and the controller may be further programmed to output a command to the series valve assembly to evenly distribute the cooling capacity of the thermal loops to the vehicle cabin and the HV battery. The controller may be further programmed to link the cabin thermal loop and the battery thermal loop responsive to detection of a charge event. The controller may be further programmed to, responsive to detection of cooling capacity requests of the cabin thermal loop and the battery thermal loop being below a predetermined threshold, output a command to the series valve assembly such that only cooling capacity of the battery thermal loop is used to cool the vehicle cabin and the HV battery. The three-way valve may be arranged within the conduit system such that in a first operating state coolant travels only between the second chiller and the HV battery. The three-way valve may be arranged within the conduit system such that in a second operating state coolant travels between the first chiller, the second chiller, and the HV battery.

A vehicle thermal management method includes detecting a high load condition of a vehicle including a cabin thermal loop including a vehicle cabin, and in fluid communication with a battery thermal loop including a high-voltage (HV) battery, outputting, via a controller, a command to a valve assembly to fluidly link the cabin thermal loop and the battery thermal loop, and outputting, via the controller, a command to a first chiller of the cabin thermal loop and a second chiller of the battery thermal loop to selectively distribute cooling capacity to the vehicle cabin and to the HV battery such that excess cooling capacity of the cabin thermal loop assists in cooling the HV battery. The high load condition may be one of an activation of a trailer tow mode or a detected vehicle load request above a predetermined threshold. The valve assembly may be a parallel valve assembly or a series valve assembly. The method may further include calculating a delta between a passenger cooling capacity request and an available cooling capacity of the cabin thermal loop, and outputting a command to the valve assembly to release a cooling capacity from the cabin thermal loop equal to the delta to the HV battery. The method may further include calculating a total cooling capacity of the cabin thermal loop and the battery thermal loop, and outputting a command to the valve assembly to selectively link the cabin thermal loop and the battery thermal loop such that the total cooling capacity is evenly distributed to the cabin thermal loop and the battery thermal loop. The method may further include linking the cabin thermal loop and the battery thermal loop to provide additional cooling capacity to the HV battery responsive to detection of a charge event.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
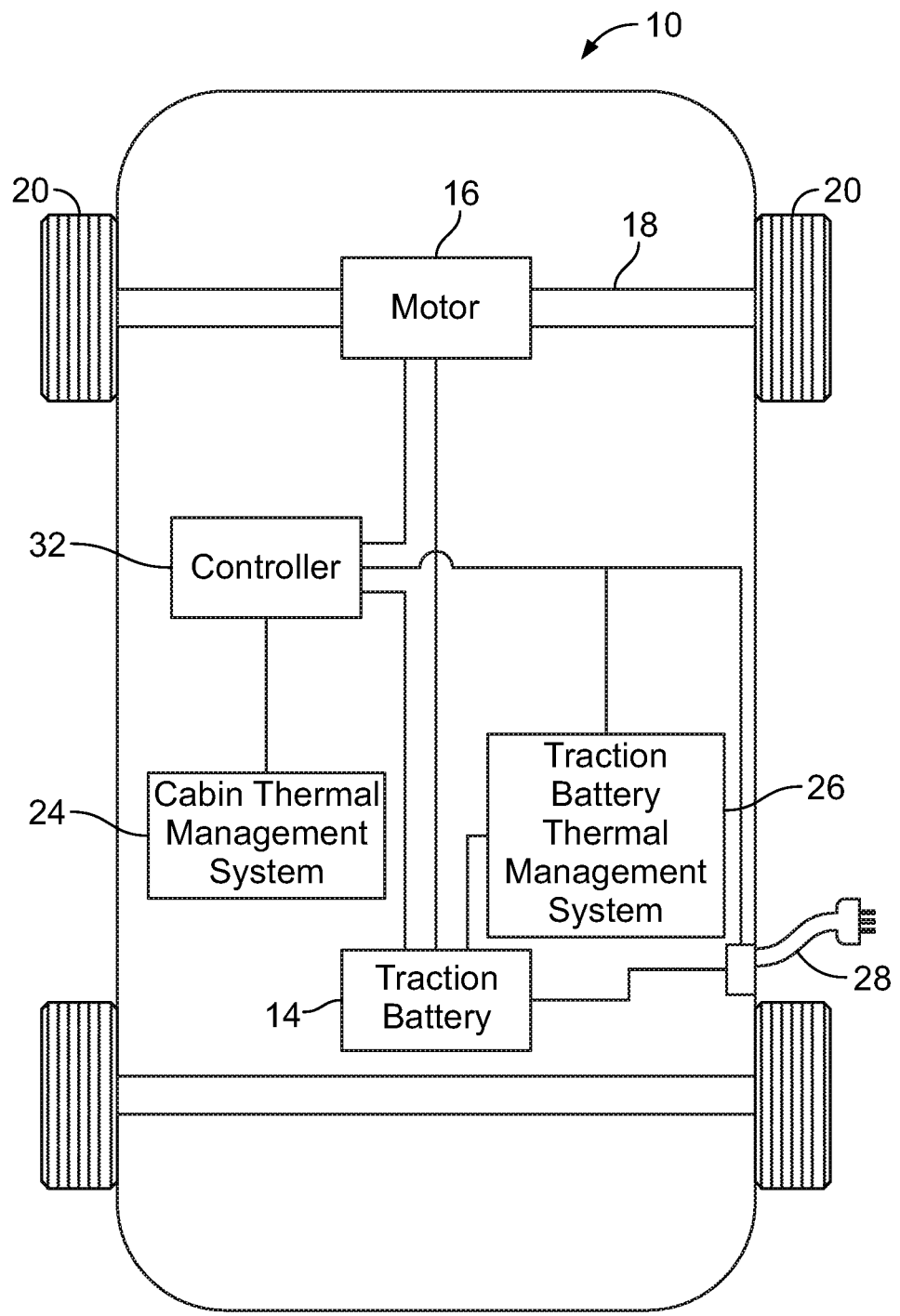
FIG. 1 is a schematic diagram illustrating an example of a battery electric vehicle.

FIG. 1 is a schematic diagram illustrating an example of a portion of an electrified vehicle, referred to as a vehicle 10 herein. In this example, the vehicle 10 is a battery electric vehicle (BEV). The vehicle 10 may include a traction battery 14 electrically connected to a motor 16. The traction battery 14 may be a high-voltage (HV) battery including one or more battery cells linked to one another to power components of the vehicle 10 such as the motor 16.

The motor 16 may be coupled to an axle 18 to drive rotation of a set of wheels 20. The vehicle 10 may further include a cabin thermal management system 24 for managing thermal conditions of a vehicle cabin (not shown) and a traction battery thermal management system 26 for managing thermal conditions of the traction battery 14. A plug 28 may be electrically connected to the traction battery 14 and may be configured to connect to an external power source (not shown) to charge the traction battery 14. A controller 32 may be in communication with the components of the vehicle 10 and may include programming to direct operation thereof.

For example, the controller 32 may be in communication with the cabin thermal management system 24 and the traction battery thermal management system 26. The controller 32 may include programming to direct operation of the thermal management systems. The direction may be based on detected conditions. For example, one or more sensors (not shown) may be located in various positions within the vehicle 10 to monitor component thermal conditions and to send signals to the controller 32 reflective of the thermal conditions.

Figure 2B:
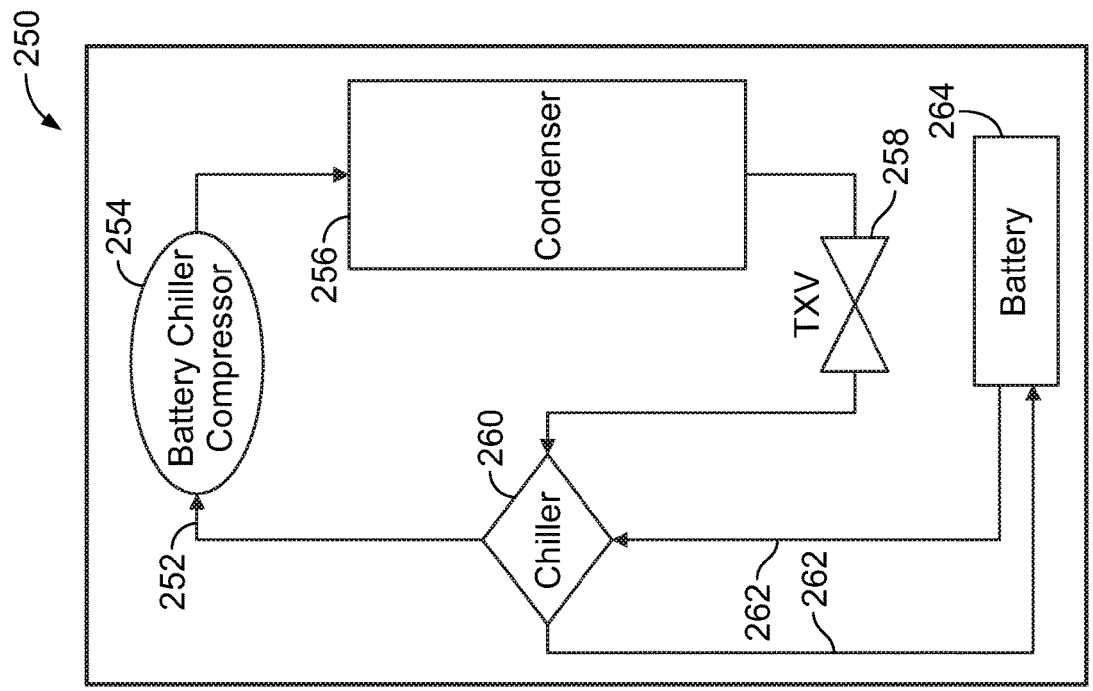
FIG. 2B is a schematic diagram illustrating another example of a prior art architecture for a vehicle thermal management system of an electrified vehicle.
Figure 2A:
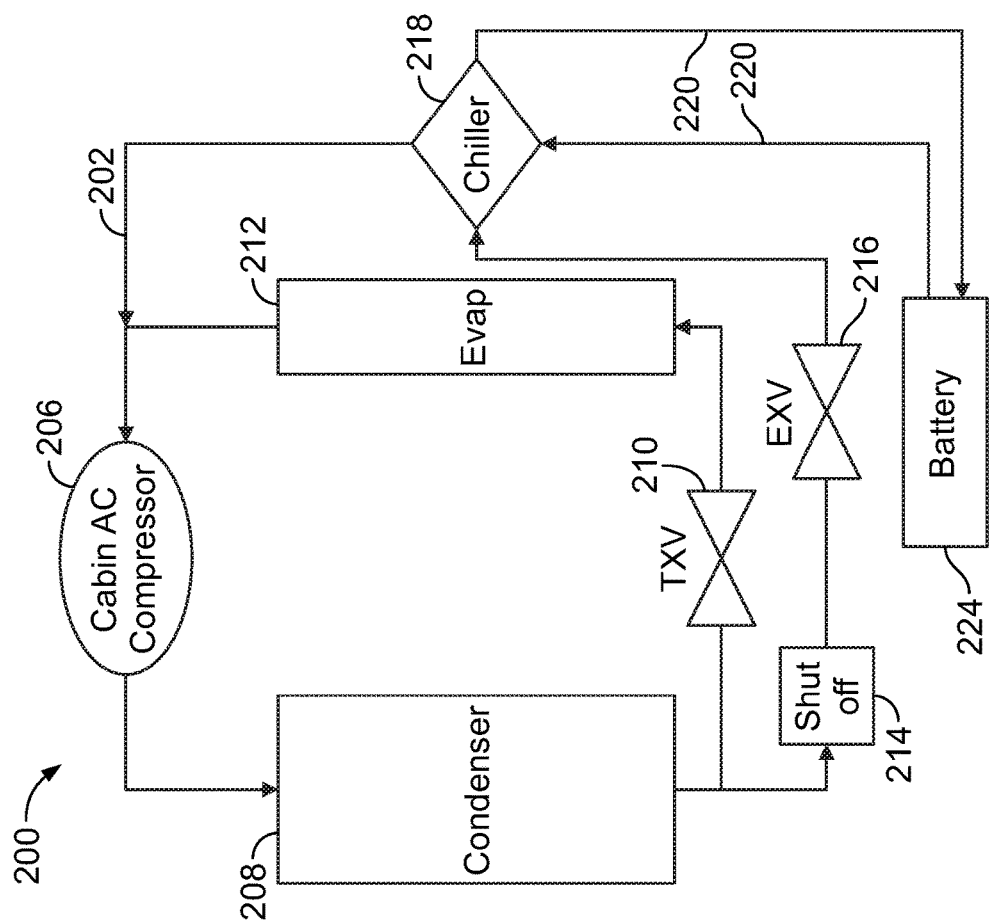
FIG. 2A is a schematic diagram illustrating an example of a prior art architecture for a vehicle thermal management system of an electrified vehicle.

FIG. 2A is a schematic diagram illustrating a portion of a prior art architecture of a vehicle thermal management system for a BEV, referred to generally as a thermal management system 200 herein. The thermal management system 200 operates to manage thermal conditions of a vehicle cabin and a HV battery with a single chiller and a single evaporator. A first conduit 202 is arranged with components of a first portion of the thermal management system 200 to transfer refrigerant therebetween. For example, the first conduit 202 transfers refrigerant between a cabin AC compressor 206, a condenser 208, a thermal expansion valve (TXV) 210, an evaporator 212, a shutoff valve 214, an electronic expansion valve (EXV) 216, and a chiller 218.

A second conduit 220 is arranged with the chiller 218 and a HV battery 224 to transfer coolant therebetween to assist in managing thermal conditions of the HV battery 224. The first portion and the second portion may be linked such that the evaporator 212 and the chiller 218 may assist in managing thermal conditions of both the vehicle cabin and the HV battery 224. However, a cooling capacity of each of the evaporator 212 and the chiller 218 is typically not high enough to cool both the vehicle cabin and the HV battery 224 under certain conditions.

For example, a cooling capacity of the evaporator 212 may be equal to 5 kW. A cooling capacity of the chiller 218 may be equal to 5 kW. Cooling capacity requests to cool the vehicle cabin and the HV battery 224 may be greater than the cooling capacity of the evaporator 212 and the chiller 218. In this example, the thermal management system 200 may see large swings in vehicle cabin discharge temperatures due to an inability to utilize both the evaporator 212 and the chiller 218 to cool a single target. In this example, the thermal management system 200 will not be able to both satisfy the request for vehicle cabin cooling and provide an appropriate amount of cooling to the HV battery 224.

FIG. 2B is a schematic diagram illustrating a portion of a prior art architecture of a vehicle thermal management system of a BEV, referred to generally as a thermal management system 250 herein. The thermal management system 250 operates to manage thermal conditions of a HV battery with a single chiller. A first conduit 252 is arranged with components of a first portion of the thermal management system 250 to transfer refrigerant therebetween. For example, the first conduit 252 transfers refrigerant between a battery chiller compressor 254, a condenser 256, a TXV 258, and a chiller 260.

A second conduit 262 is arranged with the chiller 260 and a HV battery 264 to transfer coolant therebetween. In this example, the HV battery 264 may only receive thermal management benefits from a single chiller. Thermal management of other portions of the vehicle, such as a vehicle cabin, are handled via a separate thermal loop.

Figure 3:
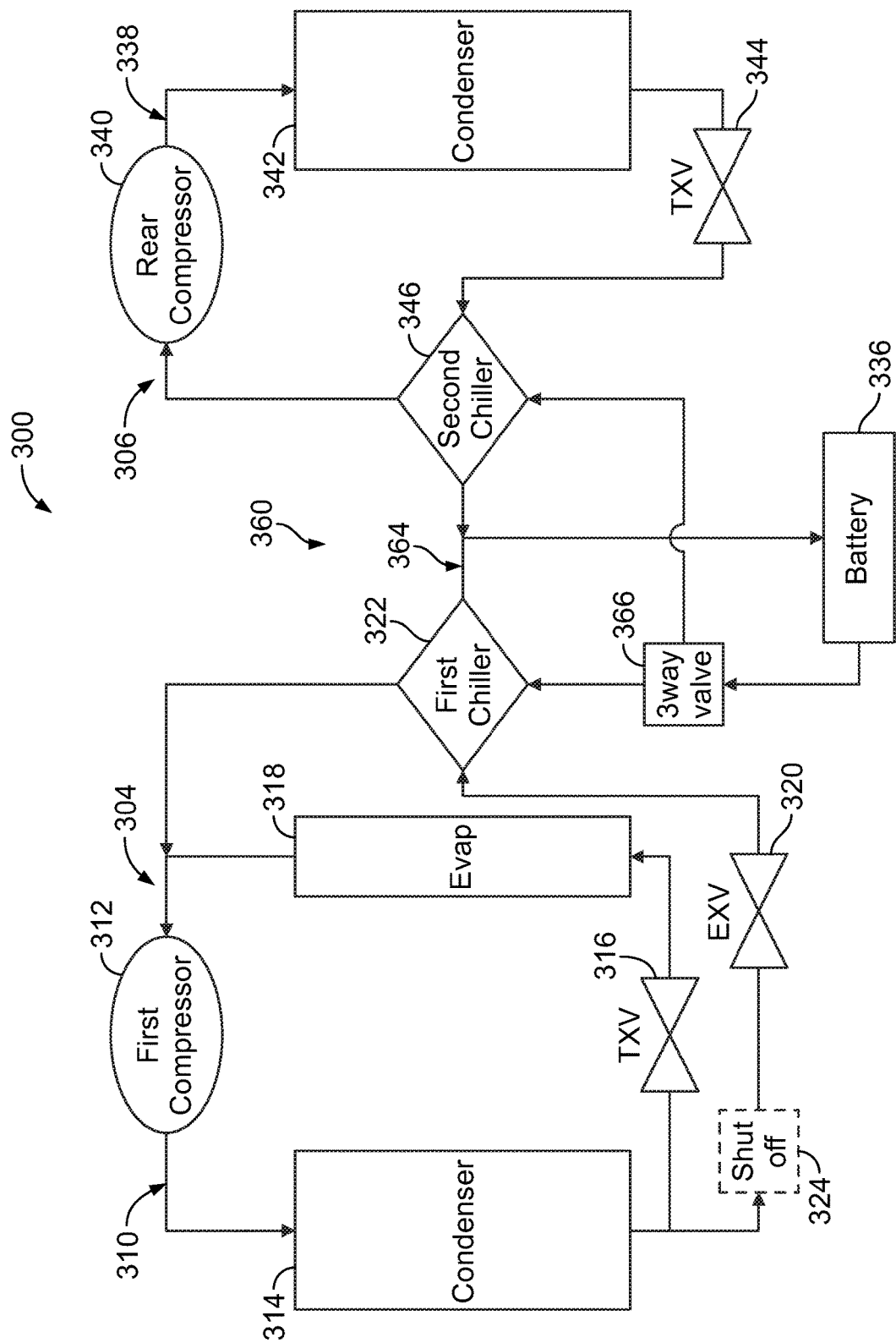
FIG. 3 is a schematic diagram illustrating an example of a portion of a thermal management system of a battery electric vehicle.

FIG. 3 is a schematic diagram illustrating a portion of an example of an architecture of a vehicle thermal management system, referred to generally as a thermal management system 300 herein. The thermal management system 300 may operate in an electrified vehicle such as a BEV. In this example, the thermal management system 300 operates as a parallel system which may include a cabin thermal loop 304 and a battery thermal loop 306.

The cabin thermal loop 304 may be in fluid communication with a vehicle cabin and may operate to manage thermal conditions thereof. The cabin thermal loop 304 includes a first conduit system 310 to facilitate a transfer of refrigerant between components of the cabin thermal loop 304. For example, the first conduit system 310 may facilitate the transfer of refrigerant between a first compressor 312, a first condenser 314, a thermal expansion valve (TXV) 316, an evaporator 318, an electronic expansion valve (EXV) 320, and a first chiller 322. The EXV 320 may include a shutoff valve or a shutoff valve 324 may be included as a separate unit.

The battery thermal loop 306 operates to manage thermal conditions of a HV battery 336. The battery thermal loop 306 includes a second conduit system 338 to facilitate a transfer of refrigerant between components of the battery thermal loop 306. For example, the second conduit system 338 may facilitate the transfer of refrigerant between a second compressor 340, a second condenser 342, a TXV 344, and a second chiller 346.

A parallel valve assembly 360 may operate to selectively link the cabin thermal loop 304 and the battery thermal loop 306 to provide efficient thermal management of the vehicle cabin and the HV battery 336. The parallel valve assembly 360 may include a third conduit system 364 and a three-way valve 366. The third conduit system 364 may operate to direct coolant to the HV battery 336 from the first chiller 322 and the second chiller 346 based on an operating state of the three-way valve 366. The coolant passing through the first chiller 322 may be cooled by the refrigerant traveling through the first conduit system 310 of the cabin thermal loop 304 and coolant passing through the second chiller 346 may be cooled by the refrigerant traveling through the second conduit system 338 of the battery thermal loop.

In a first operating state, the three-way valve 366 may be in a position such that the coolant of the third conduit system 364 travels between the HV battery 336 and the second chiller 346.

In a second operating state, the three-way valve 366 may be in a position such that the coolant of the third conduit system 364 passes through each of the first chiller 322 and the second chiller 346 en route to the HV battery 336. In this second operating state, the HV battery 336 may benefit from thermal management by both the cabin thermal loop 304 and the battery thermal loop 306.

For example, a controller, such as the controller 32, may be in communication with components of a vehicle including the thermal management system 300. The controller may include programming to direct operation of the components based on signals received from one or more sensors in communication with the components of the vehicle. The programming may direct action by the vehicle components for selective distribution of the cooling capacities of each of the thermal loops based on the signals, such as a signal indicating detection of a system high load condition.

A high load condition may be a vehicle condition in which vehicle components are stressed or needed to operate at high outputs resulting in component temperatures above preferred operating thresholds. Examples of high load conditions include, but are not limited to, activation of a vehicle tow mode and detection of a heavy cargo condition. During the high load condition, the vehicle components may operate at increased temperatures, such as an increased operating temperature for the HV battery 336. These increased temperatures may drive decreased performance by the vehicle components and added wear and tear to the components.

In a scenario in which a high load condition is detected and the HV battery 336 is operating at or nearing an unacceptable temperature threshold, the controller may transition the three-way valve 366 to the second operating state to provide additional thermal management benefits by linking the cabin thermal loop 304 and the battery thermal loop 306 as further described herein. In previous thermal management systems without the benefit of linking an additional thermal loop, such as the thermal management system 200 and the thermal management system 250, a thermal comfort of a passenger within the vehicle cabin may be sacrificed to provide enough cooling capacity from a single chiller to a traction battery when under a high load condition.

As another example, the controller may direct the thermal loops to operate independently of one another if cooling requirements of the vehicle cabin and the HV battery 336 may be met without linking the thermal loops. In yet another example in which neither the HV battery 336 or the vehicle cabin requires a high load cooling capacity, the controller may direct operation of the parallel valve assembly 360 such that only one of the chillers cools both the HV battery 336 and the vehicle cabin. In this example, additional system energy may be saved since only one of the compressors of the cabin thermal loop 304 or the battery thermal loop 306 is running.

Figure 4:
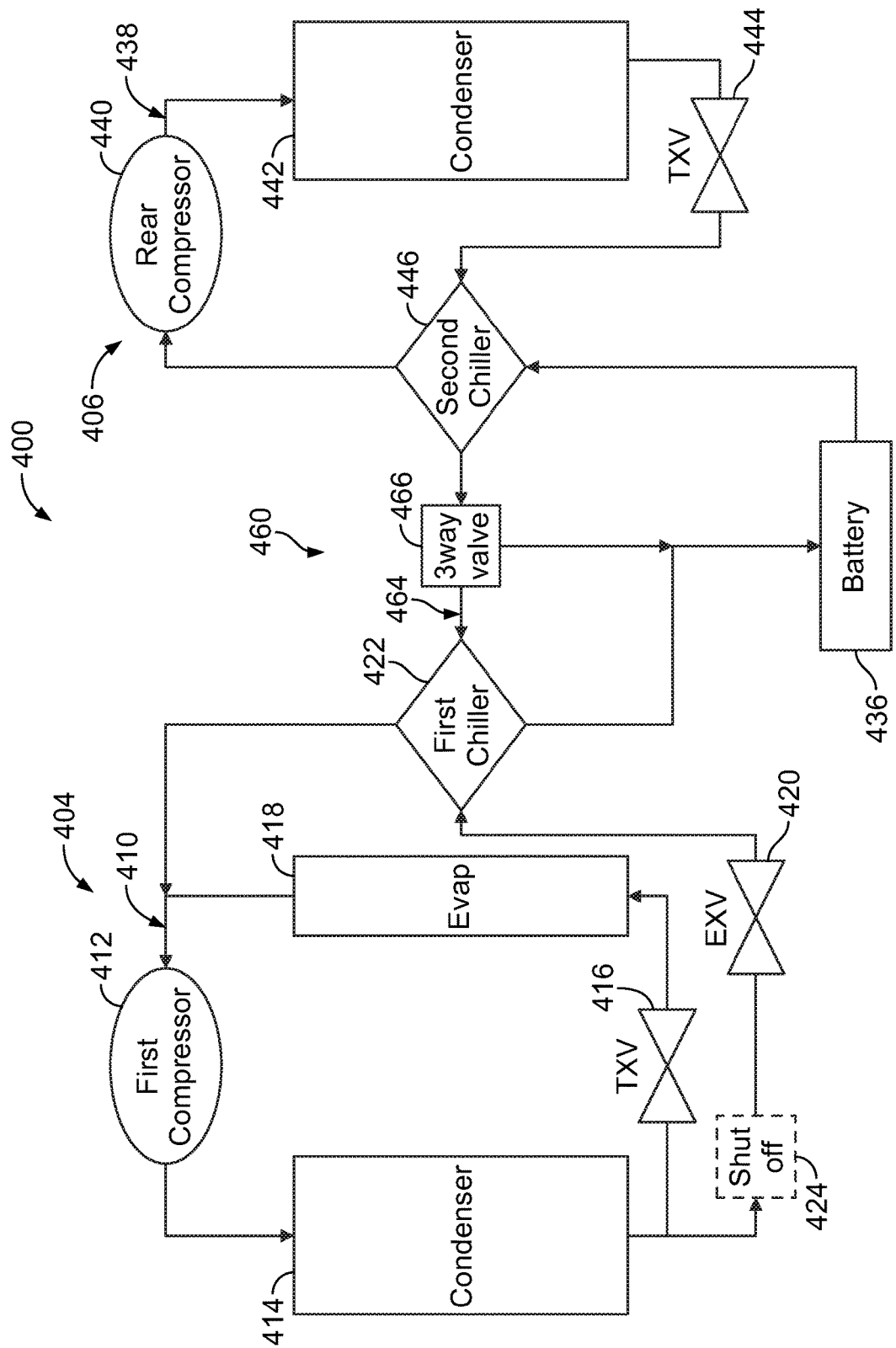
FIG. 4 is a schematic diagram illustrating an example of a portion of a thermal management system of a battery electric vehicle.

FIG. 4 is a schematic diagram illustrating a portion of an example of an architecture of a vehicle thermal management system, referred to generally as a thermal management system 400. The thermal management system 400 may operate in an electrified vehicle such as a BEV. In this example, the thermal management system 400 operates as a series system which may include a cabin thermal loop 404 and a battery thermal loop 406.

The cabin thermal loop 404 may be in fluid communication with a vehicle cabin and may operate to manage thermal conditions thereof. The cabin thermal loop 404 includes a first conduit system 410 to facilitate a transfer of refrigerant between components of the cabin thermal loop 404. For example, the first conduit system 410 may facilitate the transfer of refrigerant between a first compressor 412, a first condenser 414, a TXV 416, an evaporator 418, an EXV 420, and a first chiller 422. The EXV 420 may include a shutoff valve or a shutoff valve 424 may be included as a separate unit.

The battery thermal loop 406 operates to manage thermal conditions of a HV battery 436. The battery thermal loop 406 includes a second conduit system 438 to facilitate a transfer of refrigerant between components of the battery thermal loop 406. For example, the second conduit system 438 may facilitate the transfer of refrigerant between a second compressor 440, a second condenser 442, a TXV 444, and a second chiller 446.

A series valve assembly 460 may operate to selectively link the cabin thermal loop 404 and the battery thermal loop 406 to provide efficient thermal management of the vehicle cabin and the HV battery 436. The series valve assembly 460 may include a third conduit system 464 and a three-way valve 466. The third conduit system 464 may operate to direct coolant to the HV battery 436 from the first chiller 422 and the second chiller 446 based on an operating state of the three-way valve 466. The coolant passing through the first chiller 422 may be cooled by the refrigerant traveling through the first conduit system 410 and coolant passing through the second chiller 446 may be cooled by the refrigerant traveling through the second conduit system 438 of the battery thermal loop.

In a first operating state, the three-way valve 466 may be in a position such that the coolant of the third conduit system 464 travels from the second chiller 446 to the HV battery 436.

In a second operating state, the three-way valve 466 may be in a position such that the coolant of the third conduit system 464 passes through each of the first chiller 422 and the second chiller 446 en route to the HV battery 436. In this second operating state, the HV battery 436 may benefit from thermal management by both the cabin thermal loop 404 and the battery thermal loop 406.

For example, a controller, such as the controller 32, may be in communication with components of a vehicle including the thermal management system 400. The controller may include programming to direct operation of the components based on signals received from one or more sensors in communication with the components of the vehicle. The programming may direct action by the vehicle components for selective cooling capacity distribution based on the signals, such as a detection of a high load condition.

As mentioned above, a high load condition may be a vehicle condition in which vehicle components are stressed or are needed to operate at high outputs resulting in component temperatures above preferred operating thresholds. Examples of high load conditions include, but are not limited to, activation of a vehicle tow mode and detection of a heavy cargo condition. During the high load condition, the vehicle components may operate and increase a temperature thereof, such as an increased operating temperature for the HV battery 436. These increased temperatures may drive decreased performance by the vehicle components and added wear and tear to the components. In a scenario in which a high load condition is detected and the HV battery 436 is operating at or nearing an unacceptable temperature threshold, the controller may transition the three-way valve 466 to the second operating state to provide additional thermal management benefits by linking the cabin thermal loop 404 and the battery thermal loop 406. In previous thermal management systems without the benefit of linking the thermal loops, such as the thermal management system 200 and the thermal management system 250, a thermal comfort of a passenger within the vehicle cabin may be sacrificed to provide enough cooling capacity from a single chiller to a traction battery when under a high load condition.

As another example, the controller may direct the thermal loops to operate independently of one another if cooling requirements of the vehicle cabin and the HV battery 336 may be met without linking the thermal loops.

Each of the thermal management system 300 and the thermal management system 400 provide advantages in comparison to the thermal management system 200 and the thermal management system 250. Each of the thermal management system 300 and the thermal management system 400 provide calibration opportunities to promote a more efficient operation of a respective system. By linking the cabin thermal loop and the battery thermal loop, a higher amount of cooling capacity is available to direct toward a respective HV battery as needed since unused cooling capacity from the cabin thermal loop may be transferred to the battery thermal loop. Once a respective vehicle cabin is at a thermal comfort level (e.g. a temperature of a respective evaporator is at target and a respective compressor is backing off), the respective system would have additional cooling capacity to transfer to the respective battery thermal loop.

During lower vehicle load requirements, the load may be distributed evenly between the thermal loops to allow respective compressors to operate at lower speeds. Operating at lower speeds may improve compressor durability. The lower vehicle load requirements may also provide energy saving scenarios in which the controller may direct operation of the series valve assembly 460 such that only one of the chillers cools both the HV battery 436 and the vehicle cabin. In this example, additional system energy may be saved since only one of the compressors of the cabin thermal loop 404 or the battery thermal loop 406 is running.

Additionally, a system performance as related to noise, vibration, and harshness standards may be improved during fast charge events due to a reduced output of system components, such as the compressors. Further, during events requiring a low cabin load and a low battery load, the battery thermal loop may be turned off to promote energy conservation. These advantages may also facilitate a more efficient charge operation. For example, a vehicle may be charged more quickly with added cooling capacity gained by linking a respective cabin thermal loop and a respective battery thermal loop.

Figure 5:
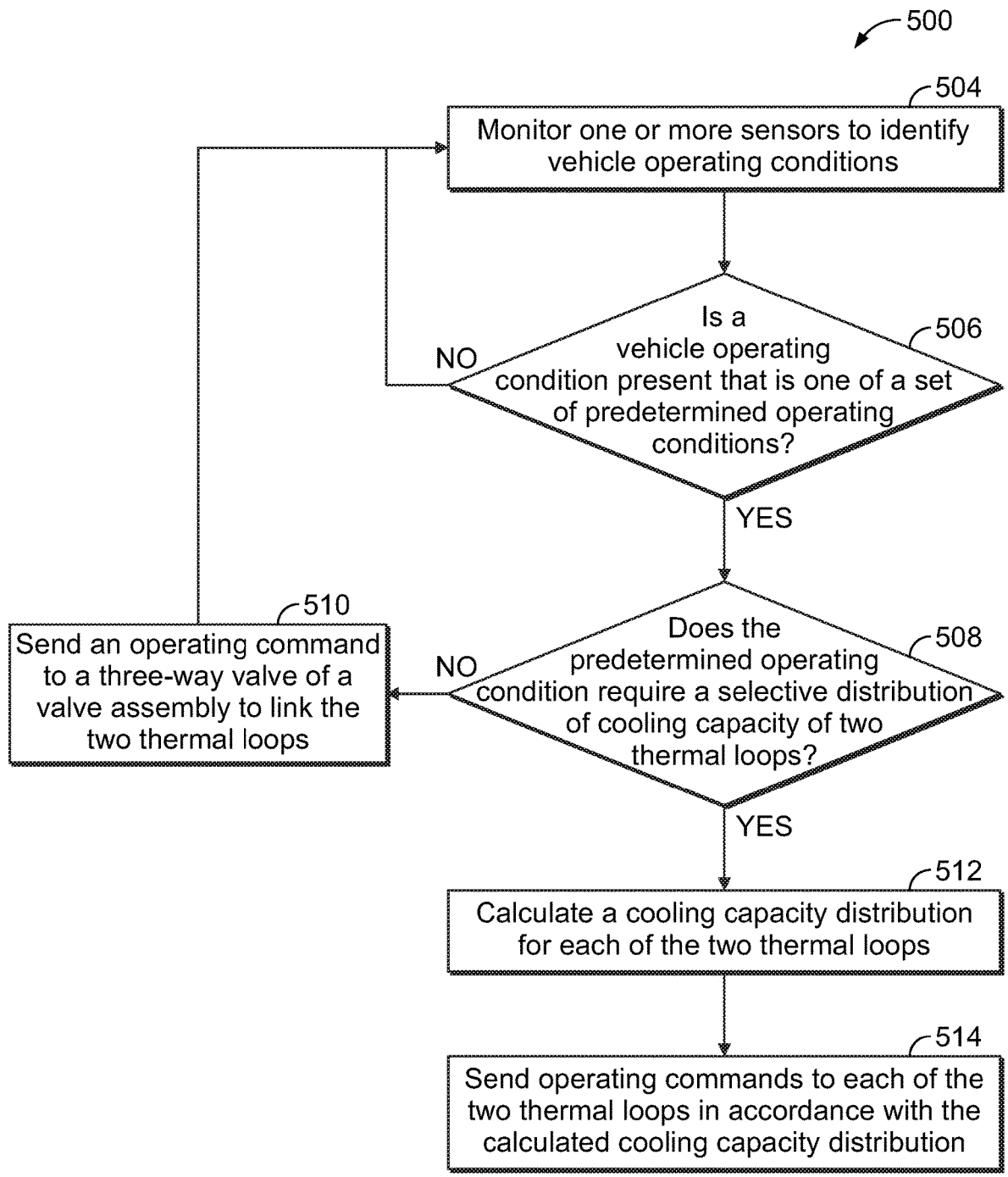
FIG. 5 is a flow chart illustrating an example of a control strategy for a vehicle thermal management system.

FIG. 5 is a flow chart illustrating an example of a control strategy for operation of a vehicle thermal management system to link two thermal loops, referred to generally as a control strategy 500 herein. In operation 504, one or more sensors may be monitored by a controller, such as the controller 32, to identify vehicle operating conditions. For example, the controller may communicate with the one or more sensors to detect operating output or temperature conditions of vehicle components.

In operation 506, the controller may identify whether an operating condition of one or more predetermined vehicle operating conditions has occurred or is occurring. Examples of the one or more predetermined vehicle operating conditions are conditions under which the vehicle experiences higher load demands and include initiation of a vehicle tow mode, detection of a cargo load over a predetermined weight, detection of a grade increase, detection of a vehicle speed increase, or any other vehicle condition in which usage of a HV battery, such as the HV battery 336 or the HV battery 436, will result in traction battery temperatures surpassing a normal operating threshold.

In the event one of the set of predetermined operating conditions is not identified as present in operation 506, the controller may revert to operation 504. In the event one of the set of predetermined operating conditions is identified in operation 506, the controller may then identify whether the predetermined operating condition requires a selective distribution of cooling capacity of two thermal loops in operation 508.

For example, the two thermal loops may comprise a cabin thermal loop, such as the cabin thermal loop 304 or the cabin thermal loop 404, and a battery thermal loop, such as the battery thermal loop 604 or the battery thermal loop 406. A cooling capacity request for the cabin thermal loop may include an air conditioning request from a passenger. A cooling capacity request for the battery thermal loop may include a request to cool the traction battery based on a battery power output related to operation of the vehicle. The controller may calculate whether a selective cooling capacity distribution of each of the thermal loops provides an optimal thermal management system output to respond to the cooling capacity requests.

In the event the controller identifies that a selective distribution of cooling capacity of the two thermal loops is not necessary, the controller may send an operating command to a three-way valve, such as the three-way valve 366 or the three-way valve 466, to operate in a first state in which the two thermal loops are not linked or a second state which links the two thermal loops in operation 510.

In the event the controller identifies that a selective distribution of cooling capacity of the two thermal loops is required, the controller may calculate a cooling capacity distribution for each of the two thermal loops in operation 512. The controller may calculate a cooling capacity output for the cabin thermal loop to meet a passenger cooling request and calculate an amount of cooling capacity available after meeting the passenger cooling request. In one example, the controller may access tables including information relating to thermal loop cooling capacities. In another example in which the vehicle is traveling at a steady state driving condition, the controller may be programmed to output a command to the valve assembly to link the thermal loops and also output operating commands to a chiller of the cabin thermal loop and a chiller of the battery thermal loop to operate at distributed levels based on a requested cooling capacity from each of the cabin thermal loop and the battery thermal loop.

In operation 514, the controller may send operating commands to each of the two thermal loops and the three-way valve to link the loops such that the calculated amount of cooling capacity available may be transferred from the cabin thermal loop to the battery thermal loop via, for example, a valve assembly, such as the valve assembly 360 and the valve assembly 460.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle thermal management system comprising:
   a cabin thermal loop including a first chiller in fluid communication with a vehicle cabin;
   a battery thermal loop including a second chiller in fluid communication with a high-voltage (HV) battery;
   a series valve assembly to selectively link the cabin and battery thermal loops including a three-way valve and a conduit system arranged with one another to selectively link the first chiller and the second chiller to deliver cooling capacity to the HV battery; and
   a controller programmed to, responsive to detection of an available amount of cabin thermal loop cooling capacity exceeding a detected passenger vehicle cabin cooling capacity request, output a command to the series valve assembly to release the excess cooling capacity from the cabin thermal loop to cool the HV battery.

2. The assembly of claim 1, wherein the controller is further programmed to, responsive to detection of activation of a vehicle trailer mode or detection of a vehicle load request over a predetermined threshold, output a command to the series valve assembly to release the excess cooling capacity from the cabin thermal loop to cool the HV battery.

3. The assembly of claim 1 further comprising one or more sensors to detect an amount of cooling capacity available from each of the cabin thermal loop and the battery thermal loop, and wherein the controller is further programmed to output a command to the series valve assembly to evenly distribute the cooling capacity of the thermal loops to the vehicle cabin and the HV battery.

4. The assembly of claim 1, wherein the controller is further programmed to link the cabin thermal loop and the battery thermal loop responsive to detection of a charge event.

5. The assembly of claim 1, wherein the controller is further programmed to, responsive to detection of cooling capacity requests of the cabin thermal loop and the battery thermal loop being below a predetermined threshold, output a command to the series valve assembly such that only cooling capacity of the battery thermal loop is used to cool the vehicle cabin and the HV battery.

6. The assembly of claim 1, wherein the three-way valve is arranged within the conduit system such that in a first operating state coolant travels only between the second chiller and the HV battery.

7. The assembly of claim 1, wherein the three-way valve is arranged within the conduit system such that in a second operating state coolant travels between the first chiller, the second chiller, and the HV battery.

* * * * *